United States Patent
Gao et al.

(10) Patent No.: US 11,284,425 B2
(45) Date of Patent: Mar. 22, 2022

(54) UPLINK SIGNAL TRANSMISSION METHOD AND SYSTEM, AND BASE STATION

(71) Applicant: HUAWEI TECHNOLOGIES CO., LTD., Shenzhen (CN)

(72) Inventors: Quanzhong Gao, Shanghai (CN); Yong Wang, Shenzhen (CN); Heng Xu, Shanghai (CN); Liwen Zhang, Shanghai (CN); Guochen Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/881,495

(22) Filed: May 22, 2020

(65) Prior Publication Data

US 2020/0288495 A1    Sep. 10, 2020

Related U.S. Application Data

(63) Continuation of application No. PCT/CN2017/112850, filed on Nov. 24, 2017.

(51) Int. Cl.
| | |
|---|---|
| *H04W 72/12* | (2009.01) |
| *H04L 5/10* | (2006.01) |
| *H04W 88/08* | (2009.01) |
| *H04W 92/12* | (2009.01) |

(52) U.S. Cl.
CPC ........... *H04W 72/1284* (2013.01); *H04L 5/10* (2013.01); *H04W 88/085* (2013.01); *H04W 92/12* (2013.01)

(58) Field of Classification Search
None
See application file for complete search history.

(56) References Cited

U.S. PATENT DOCUMENTS

| 8,903,454 B2 | 12/2014 | Lee et al. | |
|---|---|---|---|
| 9,215,296 B1* | 12/2015 | Akhter | H04W 88/085 |
| 2007/0153942 A1* | 7/2007 | Zeng | H04L 25/0328 375/340 |
| 2009/0160729 A1* | 6/2009 | Hunt | H01Q 19/106 343/893 |

(Continued)

FOREIGN PATENT DOCUMENTS

| CN | 102098071 A | 6/2011 |
|---|---|---|
| CN | 103329355 A | 9/2013 |

(Continued)

OTHER PUBLICATIONS

European Search Report issued in corresponding European Application No. 17932910.7, dated Sep. 23, 2020, European Patent Office, Munich, Germany.

*Primary Examiner* — Andrew C Oh
(74) *Attorney, Agent, or Firm* — Hauptman Ham, LLP

(57) ABSTRACT

An uplink signal transmission method includes receiving, by an active antenna unit of a base station, a first uplink signal sent by a terminal in a first band. The method also includes sending, by the base station, the first uplink signal to a first baseband processing unit of the base station corresponding to a second band for demodulation. The active antenna unit of the base station includes a first array antenna corresponding to the first band and a second array antenna corresponding to the second band. The first band is lower than the second band.

7 Claims, 5 Drawing Sheets

(56) References Cited

U.S. PATENT DOCUMENTS

| | | | |
|---|---|---|---|
| 2009/0221295 A1* | 9/2009 | Sahin | H04L 5/0037 455/450 |
| 2009/0304121 A1* | 12/2009 | Pedersen | H04L 25/03292 375/341 |
| 2011/0051852 A1* | 3/2011 | Khayrallah | H04L 25/03305 375/320 |
| 2011/0103528 A1* | 5/2011 | Khayrallah | H04L 25/03318 375/341 |
| 2011/0199992 A1* | 8/2011 | Barker | H04W 16/28 370/329 |
| 2011/0310839 A1 | 12/2011 | Kenington et al. | |
| 2011/0310941 A1* | 12/2011 | Kenington | H04W 88/085 375/220 |
| 2012/0014697 A1* | 1/2012 | Zhao | H04B 1/38 398/115 |
| 2012/0057572 A1* | 3/2012 | Evans | H04W 88/085 370/338 |
| 2012/0149317 A1 | 6/2012 | Wu et al. | |
| 2012/0176966 A1* | 7/2012 | Ling | H04W 88/085 370/328 |
| 2012/0250740 A1* | 10/2012 | Ling | H04W 88/085 375/219 |
| 2012/0329523 A1* | 12/2012 | Stewart | H04B 1/525 455/562.1 |
| 2013/0250925 A1* | 9/2013 | Lohr | H04W 56/0045 370/336 |
| 2014/0029586 A1* | 1/2014 | Loehr | H04B 3/36 370/336 |
| 2014/0185601 A1* | 7/2014 | Ilyadis | H04W 88/181 370/338 |
| 2014/0301512 A1* | 10/2014 | Beckman | H04B 7/0854 375/349 |
| 2014/0313914 A1* | 10/2014 | Ling | H04W 24/02 370/252 |
| 2014/0378047 A1* | 12/2014 | Kennard | H04B 7/15535 455/22 |
| 2015/0092660 A1* | 4/2015 | Shperling | H04B 7/15507 370/315 |
| 2015/0117435 A1* | 4/2015 | Baldemair | H04W 48/16 370/343 |
| 2015/0124906 A1* | 5/2015 | Gopalan | H04L 25/4908 375/302 |
| 2015/0244499 A1* | 8/2015 | Alexander | H03M 13/41 375/341 |
| 2015/0263435 A1 | 9/2015 | Song et al. | |
| 2015/0341802 A1* | 11/2015 | Chiang | H04W 24/02 455/424 |
| 2016/0143016 A1* | 5/2016 | Chanclou | H04W 72/0406 370/329 |
| 2016/0164587 A1* | 6/2016 | Pu | H04W 16/28 370/328 |
| 2016/0242130 A1* | 8/2016 | Moon | H04W 56/001 |
| 2016/0270080 A1* | 9/2016 | Zeng | H04L 5/06 |
| 2016/0309338 A1* | 10/2016 | Wang | H04W 16/18 |
| 2016/0315726 A1* | 10/2016 | Sandberg | H04B 7/024 |
| 2016/0316463 A1* | 10/2016 | Liu | H04W 72/1263 |
| 2016/0360571 A1* | 12/2016 | Yokosawa | H04B 1/04 |
| 2017/0077979 A1* | 3/2017 | Papa | H04B 1/40 |
| 2017/0141890 A1* | 5/2017 | Olsson | H04W 72/0453 |
| 2017/0150464 A1* | 5/2017 | Kazehaya | H04B 7/269 |
| 2017/0181010 A1* | 6/2017 | Burgess | H04L 1/0027 |
| 2017/0244582 A1* | 8/2017 | Gal | H04L 25/03057 |
| 2017/0264415 A1* | 9/2017 | Wiberg | H04B 7/0452 |
| 2017/0331618 A1* | 11/2017 | Iizuka | H04L 7/033 |
| 2017/0373890 A1* | 12/2017 | Fertonani | H04L 69/04 |
| 2018/0007724 A1* | 1/2018 | Kazmi | H04W 76/14 |
| 2018/0077006 A1* | 3/2018 | Cui | H04L 41/0816 |
| 2018/0091218 A1* | 3/2018 | Ashworth | H04B 7/15535 |
| 2018/0159632 A1* | 6/2018 | Spagnolini | H04B 10/541 |
| 2018/0212893 A1* | 7/2018 | Dev | H04W 88/08 |
| 2018/0241492 A1* | 8/2018 | Konishi | H04J 3/1652 |
| 2018/0287696 A1* | 10/2018 | Barbieri | H04W 36/22 |
| 2018/0288621 A1* | 10/2018 | Markwart | H04L 5/0035 |
| 2018/0295674 A1* | 10/2018 | Chen | H04B 7/155 |
| 2019/0014479 A1* | 1/2019 | Iovanna | H04W 16/10 |
| 2019/0052317 A1* | 2/2019 | Yiu | H04B 7/024 |
| 2019/0059010 A1* | 2/2019 | Ghosh | H04L 5/0092 |
| 2019/0150155 A1* | 5/2019 | Chatterjee | H04L 1/004 370/335 |
| 2019/0281501 A1* | 9/2019 | Berg | H04W 28/0268 |
| 2020/0205231 A1* | 6/2020 | Trojer | H04B 1/40 |

FOREIGN PATENT DOCUMENTS

| | | |
|---|---|---|
| CN | 103715521 A | 4/2014 |
| CN | 106170890 A | 11/2016 |
| CN | 106559110 A | 4/2017 |
| EP | 2375499 A1 | 10/2011 |
| EP | 2822100 A2 | 1/2015 |
| WO | 2012103845 A2 | 8/2012 |
| WO | 2013165293 A1 | 11/2013 |

* cited by examiner

UPLINK SIGNAL TRANSMISSION METHOD AND SYSTEM, AND BASE STATION

CROSS-REFERENCE TO RELATED APPLICATIONS

This application is a continuation of International Application No. PCT/CN2017/112850, filed on Nov. 24, 2017, the disclosure of which is hereby incorporated by reference in its entirety.

TECHNICAL FIELD

This application relates to the field of communications technologies, and in particular, to an uplink signal transmission method and system, and a base station.

BACKGROUND

In an existing communications system, transmit power of a base station on a downlink is quite different from transmit power of a terminal on an uplink. The base station may transmit data at power of tens of watts or hundreds of watts, and the transmit power of the terminal is usually at a milliwatt level. As a result, uplink coverage is poorer than downlink coverage. The existing communications system usually operates in a band below 2.6 GHz (sub 2.6 G), and a newly deployed communications system usually operates in a higher band, for example, a 3.5 GHz hand. In a communications system in which one site is shared for 3.5 GHz band and sub 2.6 GHz band, to ensure uplink coverage of the 3.5 GHz, band, in a current solution, an uplink service of a user that is outside uplink coverage of a high band is transmitted in a low band. This manner in Which uplink transmission and downlink transmission are performed in different bands is referred to as uplink and downlink decoupling.

Co-site coverage of the 3.5 GHz and 1.8 GHz, bands is as an example. In an area with poor uplink coverage of a high band, uplink coverage of the 3.5 GHz band is smaller than downlink coverage of the 3.5 GHz band. In this case, an uplink service of a user is transmitted in the 1.8 GHz band, and the uplink coverage may be expanded to uplink coverage of the 1.8 GHz band. In this way, the problem that the uplink coverage is poorer than the downlink coverage is resolved. However, after an uplink service of a coverage-limited user in a 3.5 GHz system are transferred to the 1.8 GHz band, the uplink coverage is improved but cannot be completely aligned with the downlink coverage of the 3.5 G band. In addition, with an increase in a quantity of users in the 1.8 GHz band, a traffic volume correspondingly increases. Consequently, resource block (RB) utilization in the 1.8 GHz band increases, and inter-cell interference in the 1.8 GHz band increases accordingly, which reduces uplink network performance of the 1.8 GHz band.

SUMMARY

A technical problem to be resolved in embodiments of this application is to provide an uplink signal transmission method and system, and a base station, to align uplink and downlink coverage and improve uplink performance of a system.

According to a first aspect, an embodiment of this application provides an uplink signal transmission method, and the method may include:

receiving, by a base station by using an active antenna unit, a first uplink signal sent by a terminal in a first band, where the terminal is located outside uplink coverage of a second band; and sending, by the base station by using a common public radio interface or an enhanced common public radio interface, the first uplink signal to a first baseband processing unit corresponding to the second band for demodulation; where the active antenna unit of the base station includes a first array antenna corresponding to the first band and a second array antenna corresponding to the second band, and the first band is lower than the second band.

By deploying a low band array antenna in a high band array antenna of the active antenna unit an uplink signal transmission path of the base station is increased. By transmitting an uplink service of a high band by using a low band, uplink coverage of the base station may be expanded. Uplink and downlink coverage is aligned by properly configuring co-site cooperation between high and low bands, and uplink performance of a system is improved.

In a possible implementation, the common public radio interface or the enhanced common public radio interface is independently used for the first array antenna.

By configuring an independent low band CPRI/eCPRI port, a high band CPRI/eCPRI resource may be prevented from being occupied. A transmission capacity between an AAU and a first BBU is increased, independent transmission of received data in a low band is implemented, and transmission performance of an uplink service is improved.

In a possible implementation, the base station receives, by using a remote radio unit corresponding to the first band, a second uplink signal sent by the terminal in the first band;

the base station sends, by using the remote radio unit, the second uplink signal to a second baseband processing unit corresponding to the first band;

the base station sends, by using the second baseband processing unit, the second uplink signal to the first baseband processing unit; and the base station performs, by using the first baseband processing unit, joint demodulation on the first uplink signal and the second uplink signal.

By performing jointly demodulation on an uplink signal received by the low frequency band array antenna deployed in the AAU and an uplink signal received by an original remote radio unit, uplink spectral efficiency of the low frequency band may be improved, a multi-antenna space division multiplexing gain is obtained, and user-perceived throughput is improved.

According to a second aspect, an embodiment of this application provides a base station, and the base station includes:

an active antenna unit, configured to receive a first uplink signal sent by a terminal in a first band, where the terminal is located outside uplink coverage of a second band; and send, by using a common public radio interface or an enhanced common public radio interface, the first uplink signal to a first baseband processing unit corresponding to the second band;

the first baseband processing unit is configured to demodulate the received first uplink signal; and the active antenna unit of the base station includes a first array antenna corresponding to the first band and a second array antenna corresponding to the second band, and the first band is lower than the second band.

In a possible implementation, the common public radio interface or the enhanced common public radio interface is independently used for the first array antenna.

In a possible implementation; the base station further includes:

a remote radio unit, where the remote radio unit corresponds to the first band and is configured to receive a second uplink signal sent by the terminal in the first band and send the second uplink signal to a second baseband processing unit corresponding to the first band;

a second baseband processing unit is configured to send the second uplink signal to the first baseband processing unit; and the first baseband processing unit is further configured to performs jointly demodulation on the first uplink signal and the second uplink signal.

In a possible implementation, a dipole of the first array antenna is located in an interval between dipoles of the second array antenna.

According to a third aspect, an embodiment of this application provides a base station, and the base station includes:

a processor, a memory, and a bus, Where the processor and the memory are connected by using the bus, the memory is configured to store a set of program code, and the processor is configured to invoke the program code stored in the memory, to perform steps in any one of the first aspect or the implementations of the first aspect in the embodiments of this application.

According to a fourth aspect, an embodiment of this application provides an uplink signal transmission system, and the system may include:

the base station according to the second aspect or any implementation of the second aspect of this embodiment of this application, and a terminal, configured to send a first uplink signal to the base station in a first band, or configured to send a first uplink signal and a second uplink signal to the base station in a first band.

According to a fifth aspect, an embodiment of this application provides a computer-readable storage medium, where the computer-readable storage medium stores an instruction. When the instruction is running on a computer, the computer is enabled to implement the method according to the first aspect or any possible implementation of the first aspect.

BRIEF DESCRIPTION OF DRAWINGS

To describe technical solutions in embodiments of this application or in the background more clearly, the following briefly describes the accompanying drawings required for describing the embodiments of this application or the background.

DESCRIPTION OF EMBODIMENTS

The following describes embodiments of this application with reference to the accompanying drawings in the embodiments of this application.

Terms "include" and "have" and any transformation thereof in the specification, claims, and accompanying drawings of this application are intended to cover non-exclusive including. For example, a process, method, system, product, or device that includes a series of steps or units is not limited to the listed steps or units; and instead, further optionally includes a step or unit that is not listed, or further optionally includes another step or unit that is intrinsic to the process, method, product, or device.

Figure 1:
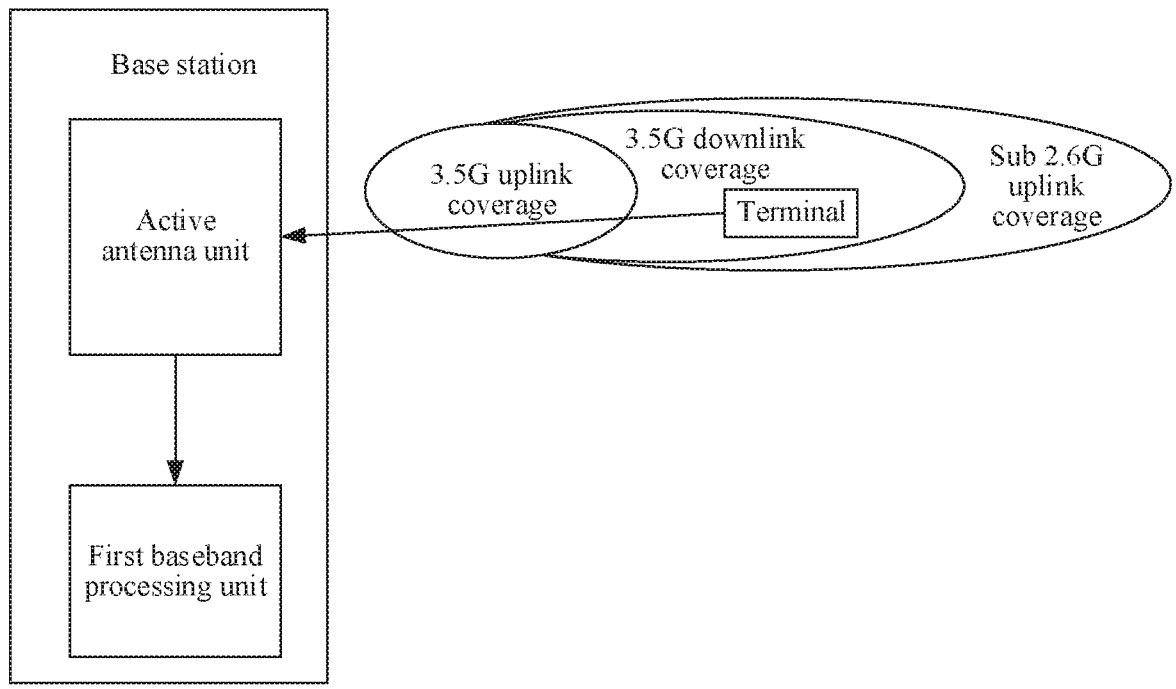
FIG. 1 is a schematic architecture diagram of an uplink signal transmission system according to an embodiment of this application.

FIG. 1 is a schematic architecture diagram of an uplink signal transmission system according to an embodiment of this application; and the system architecture includes a base station and a terminal.

The base station may include but is not limited to an evolved node B (eNB), a radio network controller (RNC), a node B (NB), a base station controller (BSC), and a base transceiver station (BTS), a home NodeB (for example, a Home evolved NodeB, or a Home Node B, HNB), or the like.

A terminal, also referred to as user equipment (UE), is a device that provides a user with voice and/or data connectivity, for example, a mobile phone, a tablet computer, or a wearable device that has a wireless connection function.

In this embodiment of this application, composition of the base station may include an active antenna unit (AAU) and a first baseband processing unit (BRU) corresponding to a high band. Under multiple bands networking, after an AAU scheme is used, radio frequency units of two or more different bands and corresponding antennas may be integrated to form the AAU. In the embodiments of this application, for ease of description, two bands are used as an example for description, A person skilled in the art should understand that more than two bands may alternatively transmit a signal by using the method and the base station in this application. This is not limited in the embodiments of this application. As shown in FIG. 1, the AAU integrates an array antenna in a high band, namely, a 3.5 G band and an array antenna in a low band, namely, a sub 2.6 G band. When the terminal is located in a 3.5 G uplink coverage area, the terminal may directly perform uplink signal transmission with the base station by using the 3.5 G band. When the terminal is located in a sub 2.6 G uplink coverage area, the terminal may directly perform the uplink signal transmission with the base station by using the sub 2.6 G band. When the terminal is located in a 3.5 G downlink coverage area outside the 3.5 G uplink coverage area, the 3.5 G band cannot be used for the uplink signal transmission. In this case, the sub 2.6 G band may be selected for the uplink signal transmission. Because the active antenna unit integrates the low band sub 2.6 G array antenna, the active antenna unit may directly receive the uplink signal and send the uplink signal to the first baseband processing unit corresponding to the 3.5 G band for signal demodulation, to obtain uplink service data.

The following describes in detail an uplink signal transmission method in this application with reference to FIG. 2 to FIG. 5.

Figure 2:
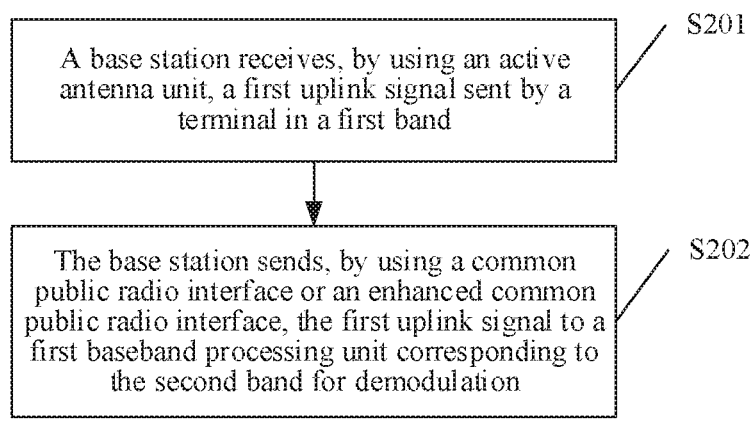
FIG. 2 is a schematic flowchart of an uplink signal transmission method according to an embodiment of this application.

FIG. 2 is a schematic flowchart of an uplink signal transmission method according to an embodiment of this application. Specifically, the following steps are included:

S201. A base station receives, by using an active antenna unit, a first uplink signal sent by a terminal in a first band.

In a possible scenario, the terminal may be located outside uplink coverage of a second band or at an uplink coverage edge of the second band.

Optionally, the terminal may be located within downlink coverage of a second band and within uplink coverage of the first band, or may be located outside downlink coverage of a second band but within uplink coverage of the first band. In this case, the terminal may send the first uplink signal by using the first band, and this is not limited in this embodiment of this application.

The active antenna unit of the base station includes a first array antenna corresponding to the first band and a second array antenna corresponding to the second band, and the first band is lower than the second band. Optionally, the first band may be a band lower than a first band threshold, and the second band may be a band higher than a second band threshold. The first band threshold is less than the second band threshold. Based on a band used in an existing communications system, the first band may be considered as a low band such as a sub 2.6 G band, and the second band may be considered as a high band such as a 3.5 G or higher band used in new radio (New Radio, NR). It should be noted that, with continuous development and evolution of communications technologies, band ranges of a high band and a low band may change. In this case, values of the first band threshold and the second band threshold may also change accordingly. This is not limited in this embodiment of this application.

Figure 3:
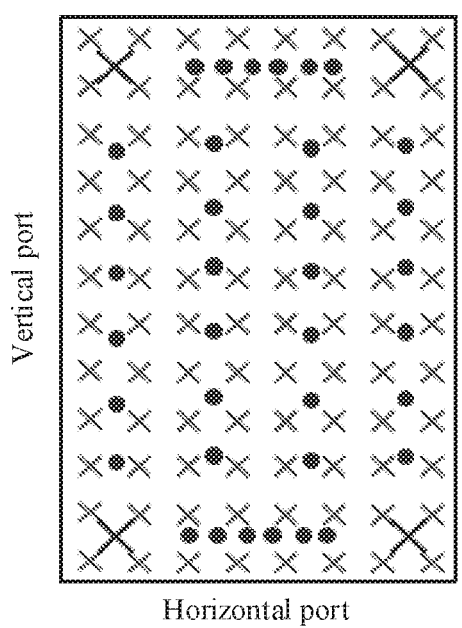
FIG. 3 is a schematic diagram of an antenna deployment in an AAU according to an embodiment of this application.

For specific implementation of the active antenna unit, refer to FIG. 3. FIG. 3 is a schematic diagram of an antenna deployment in an AAU according to an embodiment of this application. As shown in the figure, a horizontal direction represents a horizontal port of a 3.5 G array antenna, and a vertical direction represents a vertical port of the 3.5 G array antenna. Each transmit and receive channel of the 3.5 G array antenna corresponds to one single antenna. Generally, one or more dipoles form one single antenna. For example, in the 3.5 G array antenna, each single antenna corresponds to three dipoles in the vertical direction. To reduce an antenna size, a dual-polarized antenna is used in the 3.5 G array antenna. The dual-polarized antenna is a new type of antenna technology, in which two antennas having orthogonal polarization directions (+45° and −45°) are combined and both work in transmit-receive duplex mode. In other words, one dual-polarized antenna corresponds to two single antennas (in other words, corresponds to two transmit and receive channels). As shown in FIG. 3, a small x represents a dipole in the 3.5 G array antenna, and therefore, a total of 96 dipoles in 12 rows and 8 columns are included. Therefore, each column has four (12/3) dual-polarized antennas, and eight columns have 32 (8×4) dual-polarized antennas, which correspond to 64 transmit and receive channels. A large X and a small dot indicate sub 2.6 G dipoles. The sub 2.6 G dipole may be inserted in an interval between arranged 3.5 G dipoles and located between 3.5 G dipoles. A quantity of sub 2.6 G dipoles is not limited, and there may be one or more sub 2.6 G dipoles located between the 3.5 G dipoles.

An array antenna (including a plurality of dipoles) in a low band is placed on an AAU of a high-frequency massive multiple-input multiple-output system by using mixed deployment and cabling. For example, a sub 2.6 G array antenna may be deployed in an interval between the 3.5 G array antennas. In this way, a size and costs of the AAU do not change greatly, which facilitates compatibility with the original communications system and reduces costs. Certainly, dipoles of the first array antenna may alternatively be disposed in any direction around the second array antenna, provided that the first uplink signal can be received. This is not limited in this embodiment of this application.

Optionally, after the first band array antenna in the low band and the second band array antenna in the high band are deployed in an integrated manner, the first band array antenna in the low band is connected to a corresponding receive channel, the receive channel of the first array antenna in the low band may include a filter, a small signal amplifier, an analog-to-digital converter, and the like, and an electromagnetic wave signal over an air interface may be converted into a digital signal, so that the first baseband processing unit performs signal demodulation. It should be noted that the first array antenna in the low band herein may implement a signal receiving function. Costs of the receive channel are relatively low. Compared with an antenna that supports a complete transmit and receive function, costs of receiving a low band signal is significantly reduced. Certainly, when costs and an antenna size are not affected, a transmit channel of a low band signal may also be integrated into the AAU. This is not limited in the embodiments of this application.

S202. The base station sends, by using a common public radio interface (CPRI) or an enhanced common public radio interface (eCPRI), the first uplink signal to a first baseband processing unit corresponding to the second band for demodulation.

After receiving the first uplink signal, the AAU may perform demodulation by using the first baseband processing unit corresponding to the second band, that is, the high band, to obtain data of an uplink service.

Optionally, the enhanced common public radio interface or the common public radio interface is independently used for the first array antenna. That is, in a system in which the high band and the low band share an AAU, an independent interface and a transmission line may be configured for uplink signal transmission in the low band. For example, in a system in which NR 3.5 G and sub 2.6 G share an AAU, because NR 3.5 G has a large air interface bandwidth and a large quantity of antennas, transmitting data from the AAU to a first BBU requires a large quantity of CPRI/eCPRI resources. If a relatively large quantity of uplink services in a low band are transferred to a high band for transmission and processing, high-band CPRI/eCPRI resources in the high band may be occupied. Therefore, configuring an independent sub 2.6 G CPRI/eCPRI interface can prevent the CPRI/eCPRI resources in the high band from being occupied. This increases a transmission capacity between the AAU and the first BBU, implements independent transmission of data received in sub 2.6 G band, and improves transmission performance of an uplink service.

Optionally, independent transmission of data received in sub 2.6 G band may be implemented by installing an independent sub 2.6 G optical fiber module on the AAU, and the independent optical fiber module may transmit the first uplink signal in sub 2.6 G band to the first BBU by using an independent optical fiber.

Deploying a low band array antenna between high band array antennas of the active antenna unit increases an uplink signal transmission path of the base station. Transmitting an uplink service that is in a high band by using a low band can expand uplink coverage of the base station. Uplink and downlink coverage is aligned by properly configuring co-site cooperation in high and low bands, improving uplink performance of a system.

Figure 4:
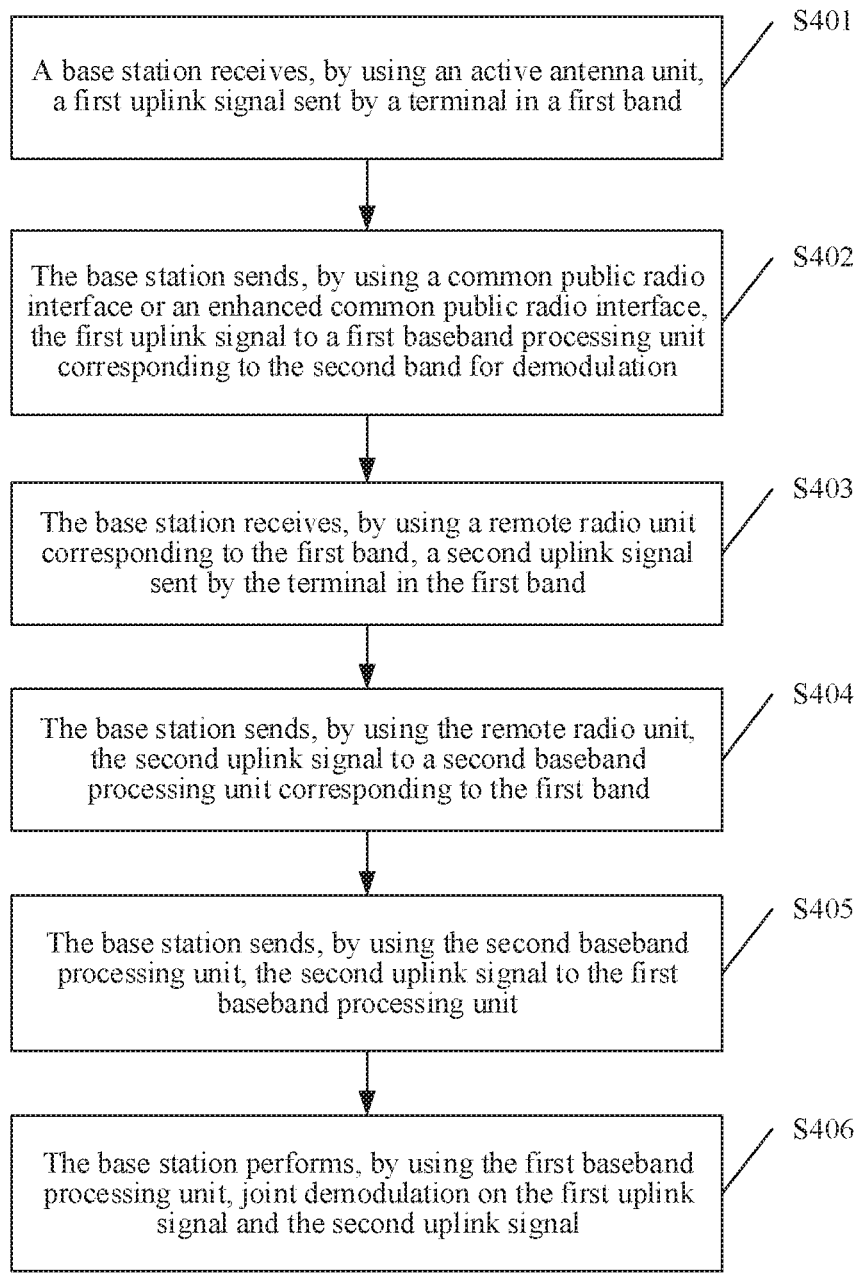
FIG. 4 is a schematic flowchart of another uplink signal transmission method according to an embodiment of this application.
Figure 5:
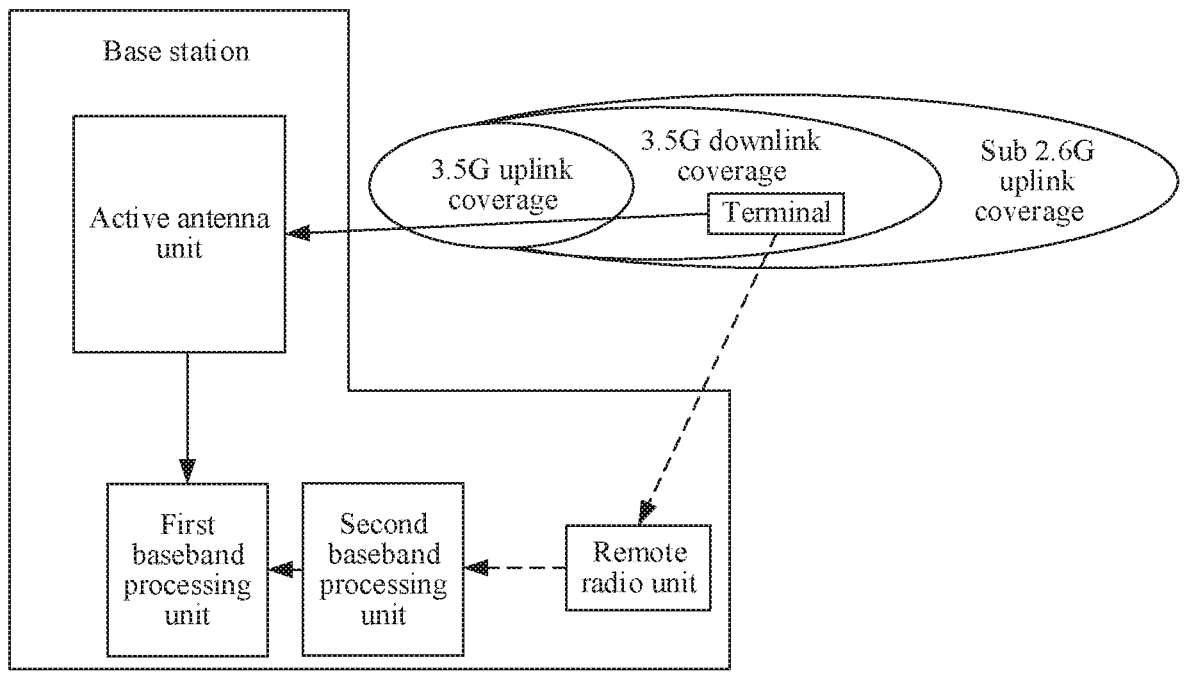
FIG. 5 is a schematic diagram of uplink signal transmission corresponding to the method in FIG. 4.

FIG. 4 is a schematic flowchart of another uplink signal transmission method according to an embodiment of this application. FIG. 5 is a schematic diagram of uplink signal transmission corresponding to the method in FIG. 4. In this embodiment, steps S401 to S402 are the same as steps S201 to S202, and details are not described herein again. After step S402, the method further include the following steps.

S403. The base station receives, by using a radio remote unit (RRU) corresponding to the first band, a second uplink signal sent by the terminal in the first band.

The second uplink signal and the first uplink signal may be a same uplink signal, that is, an uplink signal sent by the same terminal at a same time for a same uplink service. The base station may receive data by separately using the AAU and the RRU, that is, receive the first uplink signal by using the AAU, and receive the second uplink signal by using the RRU.

Alternatively, the second uplink signal may be sent for a same uplink service at a same time or different times by a same terminal that sends the first uplink signal, and may be related to demodulation of the first uplink signal. The base station may receive data by separately using the AAU and the RRU, that is, the first uplink signal may be received by the AAU, and the second uplink signal may be received by the RRU.

S404. The base station sends, by using the remote radio unit, the second uplink signal to a second baseband processing unit corresponding to the first band.

S405. The base station sends, by using the second baseband processing unit, the second uplink signal to the first baseband processing unit.

S406. The base station performs, by using the first baseband processing unit, joint demodulation on the first uplink signal and the second uplink signal.

Multi-antenna joint demodulation may mean that data received by all antennas is demodulated based on an integrated multi-antenna demodulation algorithm, or may mean that an uplink signal and a node quantity (for example, frequency domain data and a received signal obtained after multi-antenna combination) in a process of demodulating transmitted uplink signal are demodulated through coordination.

As shown in FIG. 5, a solid arrow is a transmission route of the first uplink signal, a dashed arrow is a transmission route of the second uplink signal, a radio frequency unit is an RRU corresponding to the sub 2.6 G band, and the second baseband processing unit is a BBU corresponding to the sub 2.6 G band. After being sent to the AAU, the first uplink signal is sent to a first BBU. After passing through the RRU and a second BBU, the second uplink signal is also transmitted to the first BBU. The first BBU performs multi-antenna joint demodulation on signals received by a sub 2.6 G array antenna in the AAU and a sub 2.6 G antenna in the RRU.

It should be noted that the joint demodulation described in this application may also be applicable to joint demodulation performed on a sub 2.6 G uplink signal received by another independent RRU and an uplink signal received in an LTE sub 2.6 G. This is not limited in this embodiment of this application.

With reference to the implementations in FIG. 2, FIG. 4, and FIG. 5, for example, in a Long Term Evolution (LTE) system scenario, a 3.5 G NR system and a sub 2.6 G system are deployed at a same site in a network, and two transmitters and two receivers (2T2R) have been deployed in the sub 2.6 G band. In a massive MIMO AAU in the 3.5 G NR system, a sub 2.6 G array antenna is deployed by using mixed deployment. Referring to FIG. 3, each transmit and receive channel of a 3.5 G array antenna in the AAU corresponds to one single antenna, and each single antenna corresponds to three dipoles in a vertical direction. To reduce an antenna size, a dual-polarized antenna is used in the 3.5 G array antenna. The dual-polarized antenna is a new type of antenna technology, in which two antennas having orthogonal polarization directions (+45° and −45°) are combined and both work in transmit-receive duplex mode. In other words, one dual-polarized antenna corresponds to two single antennas (that is, corresponds to two transmit and receive channels), As shown in FIG. 3, a small x represents a dipole in the 3.5 G array antenna, and therefore, a total of 96 dipoles in 12 rows and 8 columns are included, Therefore, each column has four dual-polarized antennas (12/3), and eight columns have 32 dual-polarized antennas (8×4), which correspond to 64 transmit and receive channels. The sub 2.6 G dipole is inserted in an interval between the 3.5 G dipoles. As shown in FIG. 3, the sub 2.6 G dipole is inserted every two columns, and the sub 2.6 G single antenna is only connected to a corresponding receive channel, that is, only has a receive channel function. The sub 2.6 G array antenna includes eight receive channels, each receive channel corresponds to one single antenna, and each single antenna corresponds to eight dipoles in a vertical direction (as shown in the figure, there are four columns of circle dipoles, each column is dual-polarized, and there are eight columns in total).

When a 3.5 G NR user is located outside the uplink coverage of the 3.5 G band and within the downlink coverage of the 3.5 G band, an uplink service of the 3.5 G NR user is transmitted in the sub 2.6 G band.

Eight receive antennas (8R) of the sub 2.6 G on the AAU, that is, a single receive NR system only having a signal receiving function, receive the first uplink signal of the uplink service in the sub 2.6 G band, and the first uplink signal is connected to a dedicated optical fiber module interface of the sub 2.6 G on the AAU, the 8R received signal is transmitted to the first BBU in NR by using the eCPRI/CPRI.

At the same time, an LTE sub 2.6 G system and the RRU (including 2R) corresponding to the sub 2.6 G band also receive the second uplink signal of the uplink service sent by the user in the sub 2.6 G band, and the signal received by the RRU is transmitted to the second BBU of the LTE of the system through the CPRI.

2R antenna data of the sub 2.6 G LIE received by the second BBU is transmitted to the first BBU of the NR through inter-board transmission, and the first BBU performs multi-antenna joint demodulation on the received 10R (2R of the second BBU+8R of the sub 2.6 G of the first BBU), so that uplink service data of the NR system in the sub 2.6 G band and uplink service data of the sub 2.6 G LTE are demodulated.

By deploying the 3.5 G band array antenna and the sub 2.6 G band array antenna on the AAU, uplink coverage of the NR system may be expanded to uplink coverage of the sub 2.6 GHz 2R+8R. In this way, the 3.5 G band and the sub 2.6 G band are co-sited and achieve co-coverage. In addition, during co-site construction, because the sub 2.6 G LTE uses 2R+8R, uplink spectral efficiency of the sub 2.6 G is improved, a multi-antenna space division multiplexing gain is obtained, and user-perceived throughput is improved.

Figure 6:
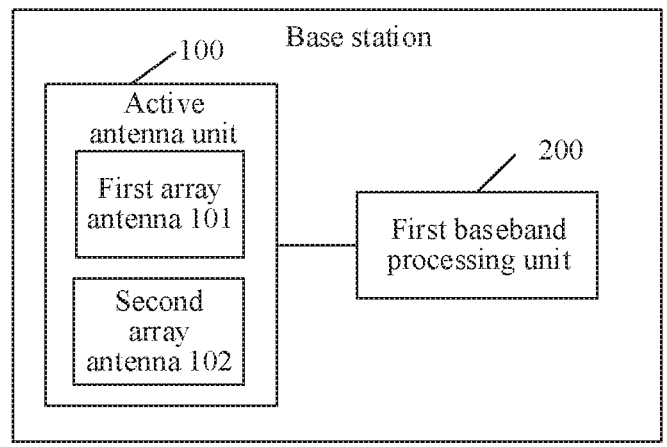
FIG. 6 is a schematic diagram of composition of a base station according to an embodiment of this application.

FIG. 6 is a schematic diagram of composition of a base station according to an embodiment of this application, and may include:

an active antenna unit 100, configured to receive a first uplink signal sent by a terminal in a first band, where the terminal is located outside uplink coverage of a second band; and send, by using a common public radio interface or an enhanced common public radio interface, the first uplink signal to a first baseband processing unit 200 corresponding to the second band;

the first baseband processing unit 200 is configured to demodulate the received first uplink signal; and the active antenna unit 100 of the base station includes a first array antenna 101 corresponding to the first band and a second array antenna 102 corresponding to the second band, where the first band is lower than the second band.

Optionally, a dipole of the first array antenna 101 is located in an interval between dipoles of the second array antenna 102. Because the first array antenna is an array antenna corresponding to a lower first band, and the second array antenna is an array antenna corresponding to a higher second band, an interval between the dipoles of the second array antenna is relatively large, and the dipoles of the first array antenna may be deployed in the intervals between the dipoles of the second array antenna by using mixed deployment. Therefore, a size of the active antenna unit may be reduced, and design costs may be reduced. Certainly, the dipole of the first array antenna may alternatively be disposed in any direction around the second array antenna, and the first uplink signal may be received. This is not limited in this embodiment of this application.

Optionally, the common public radio interface or the enhanced common public radio interface is independently used for the first array antenna 101. In a specific implementation, an independent optical fiber module may be configured for the first array antenna to transmit a signal. Therefore, occupation of a transmission interface and a transmission channel of the high frequency second array antenna is reduced, and transmission efficiency is improved.

Optionally, the first array antenna may include a transmit channel and a receive channel. In this embodiment of this application, the receive channel of the first array antenna may include a filter, a small signal amplifier, an analog-to-digital converter, and the like, and an electromagnetic wave signal of the air interface may be converted into a digital signal, so that the first baseband processing unit performs signal demodulation. It should be noted that the first array antenna of the low band herein may implement a signal receiving function. Therefore, the transmit channel of the first array antenna may be removed, and the receive channel is reserved, so that costs of receiving a low band signal by the AUU are significantly reduced.

Figure 7:
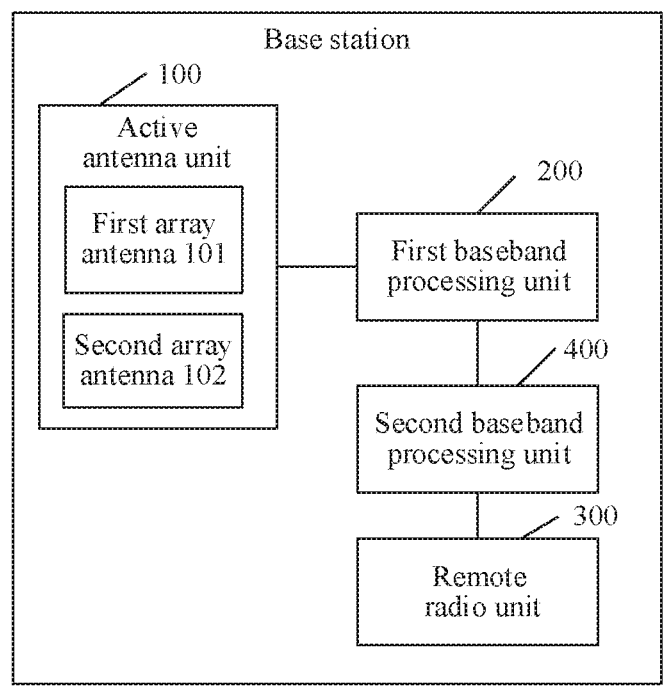
FIG. 7 is a schematic diagram of composition of another base station according to an embodiment of this application.

FIG. 7 is a schematic diagram of composition of another base station according to an embodiment of this application; and compared with FIG. 6, in this embodiment, in addition to the active antenna unit 100 and the first baseband processing unit 200, the following may be further included:

a radio remote unit 300, where the radio remote unit 300 corresponds to the first band, and is configured to receive a second uplink signal sent by the terminal in the first band and send the second uplink signal to a second baseband processing unit 400 corresponding to the first hand, where the second baseband processing unit 400 is configured to send the second uplink signal to the first baseband processing unit 200; and the first baseband processing unit 200 is further configured to perform jointly demodulation on the first uplink signal and the second uplink signal.

By performing jointly demodulation, uplink spectral efficiency of the low frequency band may be improved, a multi-antenna space division multiplexing gain is obtained, and user-perceived throughput is improved.

Figure 8:
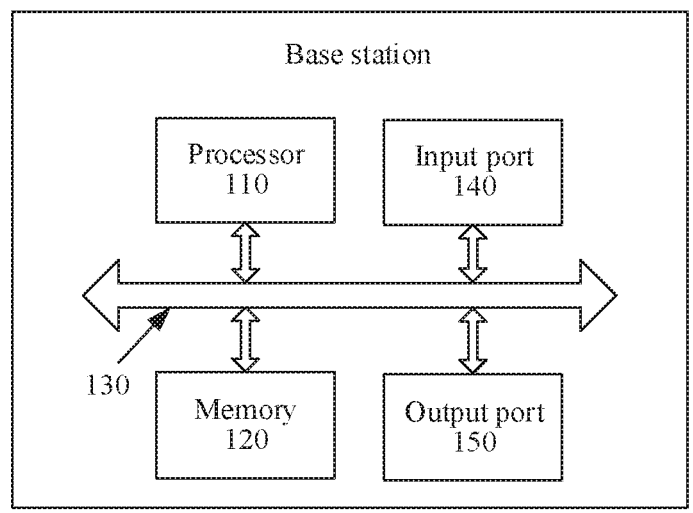
FIG. 8 is a schematic diagram of composition of still another base station according to an embodiment of this application.

FIG. 8 is a schematic diagram of composition of another base station according to an embodiment of this application; and as shown in FIG. 8, the base station may include a processor 110, a memory 120, and a bus 130, The processor 110 and the memory 120 are connected by using the bus 130. The memory 120 is configured to store an instruction, and the processor 110 is configured to execute the instruction stored in the memory 120, to implement the steps in the methods corresponding to FIG. 2 to FIG. 4.

Furthermore, the base station may further include an input port 140 and an output port 150. The processor 110, the memory 120, the input port 140, and the output port 150 may be connected by using the bus 130.

The processor 110 is configured to execute an instruction stored in the memory 120 to control the input port 140 to receive a signal and control the output port 150 to send a signal, to implement the steps performed by the base station according to the foregoing method. The input port 140 and the output port 150 may be a same physical entity or different physical entities. When the input port 140 and the output port 150 are the same physical entity, the input port 140 and the output port 150 may be collectively referred to as an input/output port. The memory 120 may be integrated into the processor 110, or may be separated from the processor 110.

In an implementation, it may be considered that functions of the input port 140 and the output port 150 are implemented by using a transceiver circuit or a dedicated transceiver chip. It may be considered to implement the processor 110 by using a dedicated processing chip, a processing circuit, a processor, or a general-purpose chip.

In another implementation, it may be considered that the base station provided in this embodiment of this application is implemented by using a general-purpose computer. To be specific, program code that implements functions of the processor 110, the input port 140, and the output port 150 is stored in the memory, and a general-purpose processor implements the functions of the processor 110, the input port 140, and the output port 150 by executing the code in the memory.

The concept, explanation, detailed description, and another step involved in the base station relating to the technical solution provided in the embodiments of this application are described with reference to descriptions about these contents in the foregoing method or another embodiments, and details are not described herein again.

A person skilled in the art may understand that for ease of description, FIG. 8 shows only one memory and one processor. Actually, a controller may include a plurality of processors and a plurality of memories. The memory may also be referred to as a storage medium, a storage device, or the like. This is not limited in this embodiment of this application.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

In addition to a data bus, the bus may further include a power bus, a control bus, a status signal bus, and the like. However, for clear description, various types of buses in the figure are denoted as the bus.

In an implementation process, steps in the foregoing methods may be implemented by using a hardware integrated logic circuit in the processor, or by using instructions in a form of software. The steps in the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. Details are not described again herein to avoid repetition.

According to the method provided in this embodiment of this application, an embodiment of this application further provides an uplink signal transmission system, including the foregoing base station and terminal. For specific composition and functions, refer to a related description and explanation in FIG. 1 and FIG. 5, Details are not described herein again.

It should be further understood that, the first, second, third, fourth, and various numbers included in this specification are merely distinguished for convenient description, and are not intended to limit the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that, the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to the embodiments of this application are produced. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (such as a coaxial cable, a fiber, or a digital subscriber line (DSL)) or wireless (such as infrared, radio, or microwave) manner. The computer readable storage medium may be any available medium capable of being accessed by a computer or include one or more data storage devices integrated by an available medium, such as a server and a data center. The usable medium may be a magnetic medium (for example, a soft disk, a hard disk, or a magnetic tape), an optical medium (for example, a DVD), a semiconductor medium (for example, a solid state disk (SSD)), or the like.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. An uplink signal transmission method, comprising:
receiving, by an active antenna unit of a base station, a first uplink signal sent by a terminal in a first band;
receiving, by a remote radio unit of the base station corresponding to the first band, a second uplink signal sent by the terminal in the first band;
sending, by the base station, the first uplink signal and the second uplink signal to a first baseband processing unit of the base station corresponding to a second band;
sending, by the remote radio unit of the base station, the second uplink signal to a second baseband processing unit of the base station corresponding to the first band;
sending, by the second baseband processing unit of the base station, the second uplink signal to the first baseband processing unit for joint demodulation on the first uplink signal and the second uplink signal; and performing, by the first baseband processing unit of the base station, the joint demodulation on the first uplink signal and the second uplink signal, wherein the active antenna unit of the base station comprises a first array antenna corresponding to the first band and a second array antenna corresponding to the second band, and the first band is lower than the second band.

2. The method according to claim 1, wherein the base station sends the first uplink signal to the first baseband processing unit by way of a common public radio interface or an enhanced common public radio interface, and the common public radio interface or the enhanced common public radio interface independently communicates data in the first band.

3. A base station, comprising:

an active antenna unit, comprising a first array antenna corresponding to a first band and a second array antenna corresponding to a second band;

a first baseband processing unit corresponding to the second band;

a second baseband processing unit corresponding to the first band; and a remote radio unit corresponding to the first band, wherein the active antenna unit is configured to receive a first uplink signal sent by a terminal in the first band, the remote radio unit is configured to:

receive a second uplink signal sent by the terminal in the first band; and send the second uplink signal to the second baseband processing unit, the second baseband processing unit is configured to send the second uplink signal to the first baseband processing unit to jointly demodulate the first uplink signal and the second uplink signal, the first baseband processing unit is configured to jointly demodulate the received first uplink and the second uplink signal, and the first band is lower than the second band.

4. The base station according to claim 3, wherein the first array antenna comprises a common public radio interface or an enhanced common public radio interface configured to send the first uplink signal to the first baseband processing unit, and the common public radio interface or the enhanced common public radio interface independently communicates data in the first band.

5. The base station according to claim 3, wherein a dipole of the first array antenna is located in an interval between dipoles of the second array antenna.

6. An uplink signal transmission system, comprising:

a base station; and a terminal, configured to send a first uplink signal and a second uplink signal to the base station in the first band, wherein the base station comprises:

a processor; and a non-transitory computer-readable storage medium coupled to the processor and having instructions stored thereon that, when executed by the processor, cause the base station to:

receive, by an active antenna unit of the base station, the first uplink signal sent by the terminal in the first band;

receive by a remote radio unit of the base station corresponding to the first band, the second uplink signal sent by the terminal in the first band;

send the first uplink signal and the second uplink signal to a first baseband processing unit of the base station corresponding to a second band;

send, by the remote radio unit of the base station, the second uplink signal to a second baseband processing unit of the base station corresponding to the first band;

send, by the second baseband processing unit of the base station, the second uplink signal to the first baseband processing unit for joint demodulation on the first uplink signal and the second uplink signal; and jointly demodulate, by the first baseband processing unit of the base station, the first uplink signal and the second uplink signal, wherein the active antenna unit of the base station comprises a first array antenna corresponding to the first band and a second array antenna corresponding to the second band, and the first band is lower than the second band.

7. The uplink signal transmission system according to claim 6, wherein the first array antenna comprises a common public radio interface or an enhanced common public radio interface configured to send the first uplink signal to the first baseband processing unit, and the common public radio interface or the enhanced common public radio interface independently communicates data in the first band.

* * * * *